(12) United States Patent
Karaoguz et al.

(10) Patent No.: US 7,990,949 B2
(45) Date of Patent: Aug. 2, 2011

(54) ENHANCED WIDE AREA NETWORK SUPPORT VIA A BROADBAND ACCESS GATEWAY

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1420 days.

(21) Appl. No.: 11/159,034

(22) Filed: Jun. 22, 2005

(65) Prior Publication Data

US 2006/0098627 A1 May 11, 2006

Related U.S. Application Data

(60) Provisional application No. 60/626,223, filed on Nov. 9, 2004.

(51) Int. Cl.
*H04L 12/66* (2006.01)
(52) U.S. Cl. ......... 370/352; 370/328; 370/390; 370/401
(58) Field of Classification Search .................. 370/352, 370/328, 390, 401
See application file for complete search history.

(56) References Cited

U.S. PATENT DOCUMENTS

| | | | |
|---|---|---|---|
| 6,560,213 B1 * | 5/2003 | Izadpanah et al. | 370/338 |
| 6,628,627 B1 * | 9/2003 | Zendle et al. | 370/310 |
| 2002/0191557 A1 * | 12/2002 | Chow et al. | 370/329 |
| 2003/0058818 A1 | 3/2003 | Wilkes et al. | |
| 2003/0058827 A1 * | 3/2003 | Chow et al. | 370/338 |
| 2003/0108176 A1 * | 6/2003 | Kung et al. | 379/211.02 |
| 2003/0119489 A1 | 6/2003 | Mohammed | |
| 2003/0202506 A1 | 10/2003 | Perkins et al. | |
| 2004/0017786 A1 | 1/2004 | Shively | |
| 2004/0116120 A1 | 6/2004 | Gallagher et al. | |
| 2005/0083874 A1 * | 4/2005 | Guo et al. | 370/328 |
| 2005/0271018 A1 * | 12/2005 | Liu et al. | 370/338 |
| 2006/0209795 A1 * | 9/2006 | Chow et al. | 370/352 |
| 2008/0043691 A1 * | 2/2008 | Chow et al. | 370/338 |

FOREIGN PATENT DOCUMENTS

CN 1513269 A 7/2004

OTHER PUBLICATIONS

RFC 2865, Network Working Group. Jun. 2000. Rigney et al.*
EPO Communication dated Sep. 8, 2010 in Application No. 05017632.0-1249 / 1655896.

* cited by examiner

*Primary Examiner* — Quynh H Nguyen
(74) *Attorney, Agent, or Firm* — McAndrews, Held & Malloy

(57) ABSTRACT

A wireless broadband access gateway having a wireless interface compatible with any of a number of commercial wireless wide area network standards provides enhanced wire area network coverage via a broadband network. The gateway may function as a wireless wide area network base station having a small coverage area, and may be communicatively coupled via a broadband access provider to a broadband wireless controller that cooperatively coordinates call management for access devices comprising cellular or mobile multimedia handsets. The broadband network may comprise cable, digital subscriber line, satellite, T1, or T3 type networks, and may carry traffic unrelated to the signaling, control, voice, and multimedia information of associated with wide area network calls. The wireless broadband access gateway may comprise a set-to-box, and may operate to convert from air interface protocols used to communicate with mobile handsets of the wireless wide area network, to/from the packet-based protocols that may be used in the broadband network.

44 Claims, 4 Drawing Sheets

ENHANCED WIDE AREA NETWORK SUPPORT VIA A BROADBAND ACCESS GATEWAY

RELATED APPLICATIONS

The present application makes reference to, claims priority to, and claims benefit of U.S. Provisional Patent Application Ser. No. 60/626,223, entitled "Method And System For Enhanced Wide Area Network Support Via A Broadband Access Gateway", filed Nov. 9, 2004, the complete subject matter of which is hereby incorporated herein by reference, in its entirety.

The present application also makes reference to U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporate herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz. The installation of the equipment and communications facilities for solving small area coverage problems in commercial wireless wide area networks is cost prohibitive. Frequently the problem goes unsolved, or the service provider compensates by adjusting other equipment to cover the affected area. This may lead to misuse of spectrum resources and less than optimal system capacity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method providing enhanced wide area network support via a broadband access gateway, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention pertain to enhancing wide area network service coverage for wireless communication services such as, for example, cellular or personal communication services (PCS), using a broadband access gateway. A representative embodiment of the present invention exploits the ever increasing consumer and business adoption and availability of broadband communication services such as, for example, cable, digital subscriber loop (DSL), and satellite broadband service. A user of a multimedia mobile handset may enjoy seamless wide area network coverage with improved quality of service (QoS) through the use of a broadband access gateway capable of communicating as a local, low-power interface managed by the wide area service provider via a broadband network.

Figure 1:
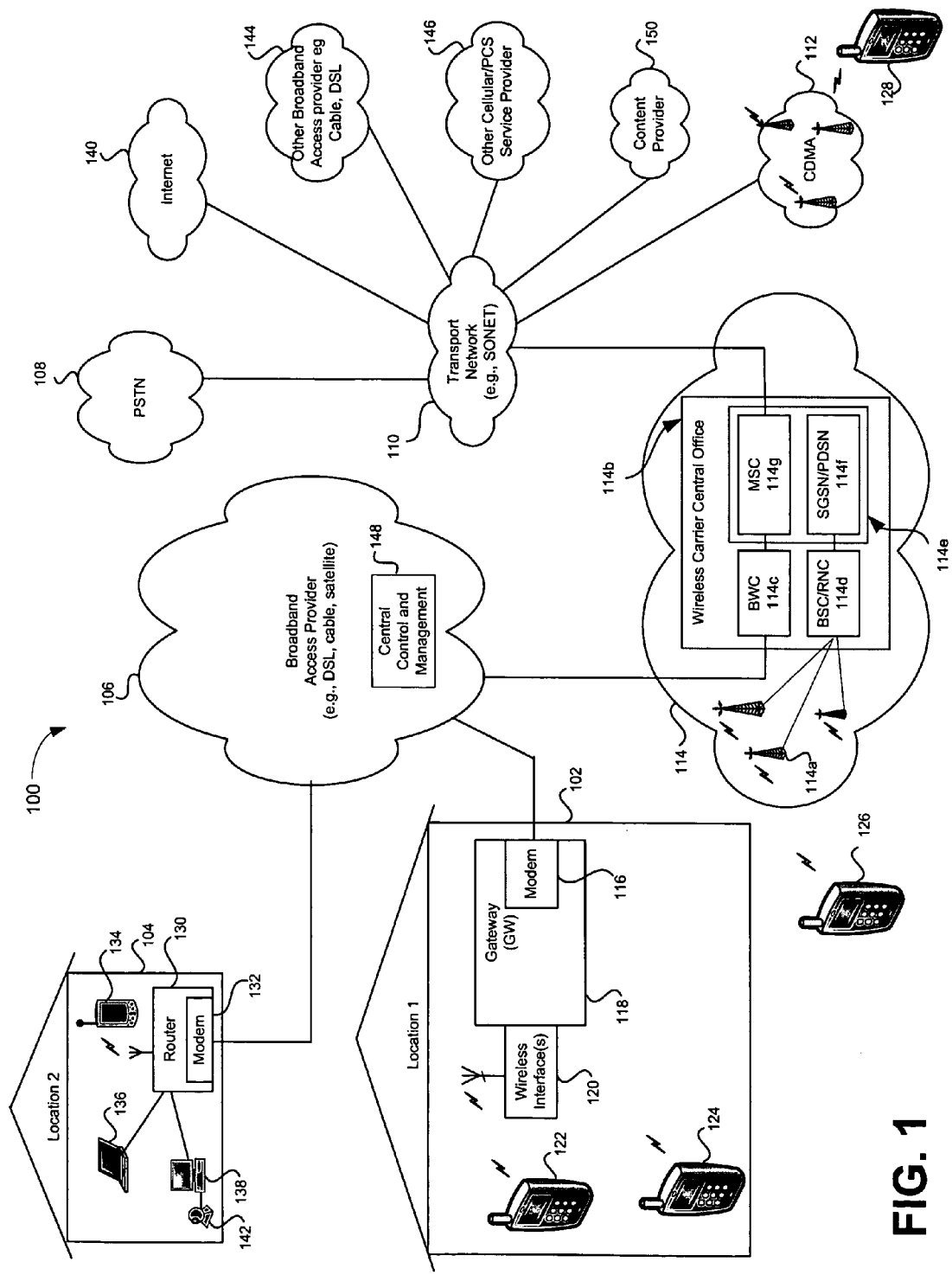
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a cellular or mobile multimedia handset capable of communication via one of the wide area networks such as, for example, the GSM network 114. In addition to standard voice capability, the access devices 122, 124, 126, 128 may have a high level of functionality such as, for example, that of one or more of a digital video or still camera, a portable audio (MP3) player, a personal digital assistant, and a voice handset. In addition to operating via one or more wide area networks, the access devices 122, 124, 126, 128 may be capable of operating using, for example, a personal area network and/or wireless local area network compliant with, for example, Bluetooth, IEEE 802.11a/b/g/n, and/or IEEE 802.15.3a ultrawideband standards. The second location 104 comprises a router 130 having a modem 132, and may have a plurality of wireless access devices. The plurality of wireless access devices at the second location 104 may, for example, comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. In a representative embodiment of the present invention, the wireless interface block 120 may comprise functionality to support any of the wireless wide area networks such as, for example, cellular digital packet data (CDPD), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few. In a representative embodiment of the present invention, the wireless interface 120 may also comprise one or more interfaces such as, for example, a Bluetooth interface, an IEEE 802.15.3a ultrawideband interface, and any combination of an IEEE 802.11a, b, g and/or n interfaces, for example.

FIG. 1 also comprises an "other broadband access provider" block 144, an "other cellular/PCS service provider" block 146, a central control and management block 148, and a content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention. The central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108. In another instance, the BAP 106 may be a local multipoint distribution service (LMDS) broadband service provider.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114*a* may comprise a base transceiver station (BTS), and one or more base transceiver stations (BTSs) may be coupled to wireless carrier central office 114*b*. The wireless carrier central office 114*b* may comprise a base station controller/radio network controller (BSC/RNC) such as BSC/RNC 114*d*. One or more base station controllers/radio network controllers (BSCs/RNCs) may be coupled to the core network 114*e*, that comprises a network edge switch called a mobile switching center (MSC) such as MSC 114*g*, and a serving GPRS support node (SGSN)/packet data serving node (PDSN) 114*f*, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may instead be handed off to, for example, a local or reduced coverage area cell that may be located within the user's home. The local cell may operate in cooperation with the wireless wide area network serving the call. For example, with reference to FIG. 1, as the access device 126 migrates from the vicinity of the serving cell site 114*a* in GSM network 114 towards the wireless interface 120 in the first location 102, the call may be handed off from the cell site 114*a* of GSM network 114, to the local coverage of the wireless interface 120 coupled to the gateway (GW) 118 at the first location 102. Accordingly, instead of the call being dropped, the call has been seamlessly handed off and is now being handled by the gateway 118 via the wireless interface 120. The resulting voice and signaling information for the call may then be communicated by the gateway 118 to the GSM network 114 via the broadband connection to the BAP 106 which is connected to the broadband wireless controller (BWC) 114*c*.

In this illustration, the user of the access device 126 is handed off to a local, small radius cell located within their home or business. However, the user could also have been handed off to another local cell at a different location such as, for example, a neighbor's home, or a small business or office such as, for example, the location 104. In any case, a gateway and wireless interface such as, for example, the gateway 118 and wireless interface 120 may provide localized support for wireless wide area network service using a broadband access provider such as, for example, the cable or DSL BAP 106 to a wireless wide area service provider such as, for example, the GSM network 114, the CDMA network 112, and the other cellular/PCS service provider 146. In a representative embodiment of the present invention, the gateway 118, the central control and management block 148, the broadband wireless controller 114*c*, and the MSC 114*g* may work together to support handoff of calls between the local, small-radius coverage area of the wireless interface 120, and the larger coverage area of the wireless wide area network of, for example, the GSM network 114. The user may be provided with a notification of the handoff to a local, small-radius cell, or the handoff may occur without user notification. For example, an icon or a text message may be displayed on the screen of the access device 126 once a soft or hard service handoff is achieved from a serving cell site such as, for example, the cell site 114*a* in GSM network 114, to the wireless interface 120 at the first location 102. A special tone or other audio alert may also be utilized to indicate that the call has switched to the wireless interface 120.

Figure 2:
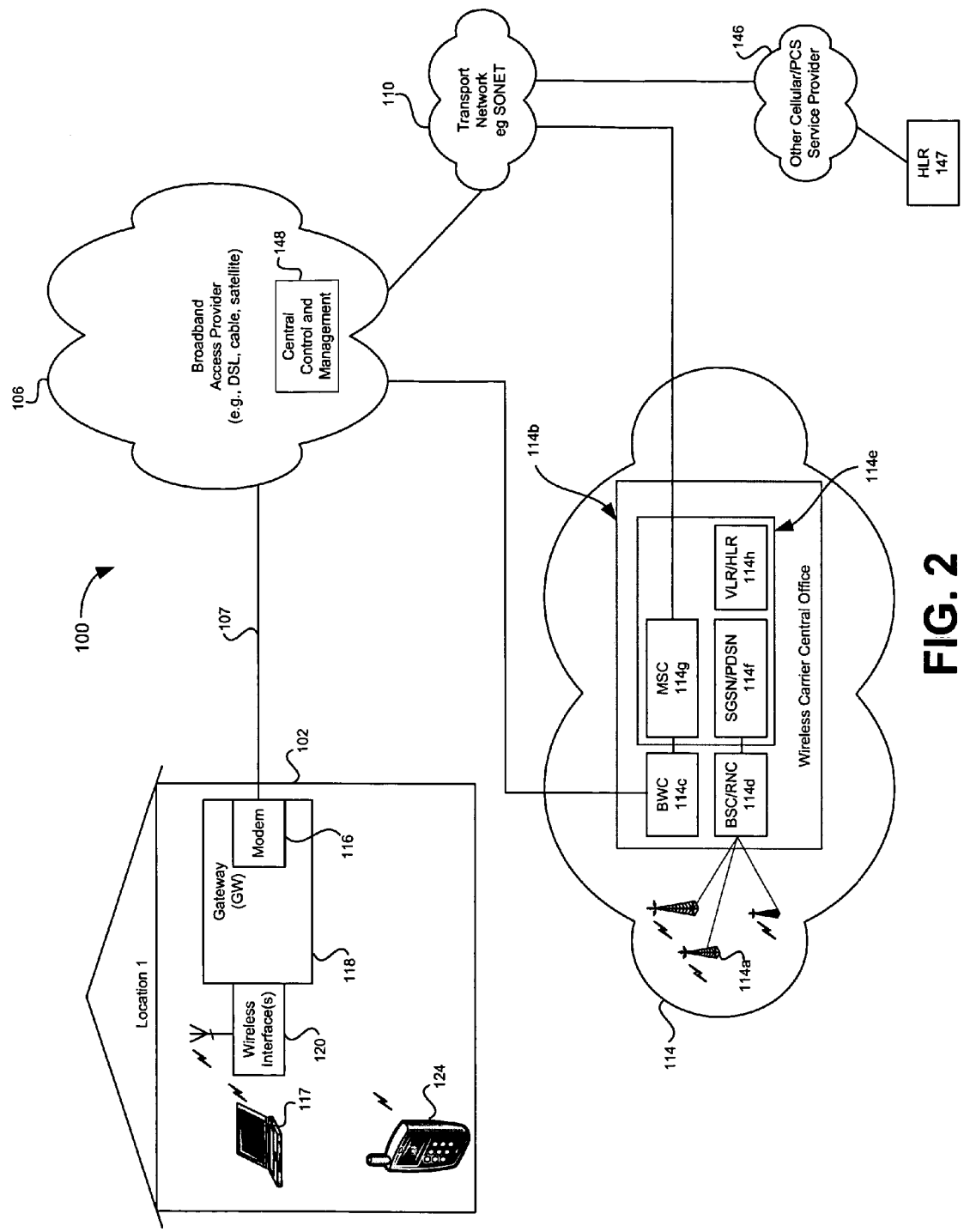
FIG. 2 shows a block diagram illustrating an exemplary communication network, in accordance with a representative embodiment of the present invention.

FIG. 2 shows a block diagram illustrating an exemplary communication network 100, in accordance with a representative embodiment of the present invention. The communication network 100 shown in FIG. 2 comprises a wireless interface 120, and a gateway (GW) 118 with a modem 116, at a location 1 102. An access device such as access device 124 may be mobile, and may move between the wireless wide area network coverage provided by wireless interface 120, and the wireless wide area network coverage provided by, for example, the base station 114*a* of the GSM network 114. The access device 124 of FIG. 2 may correspond, for example, to the access devices 122, 124, 126 of FIG. 1. The location 1 102 may, for example, be the home of the user of the access device 124, the home of a friend or relative of the user of access device 124, or an office, business, etc., where the user of access device 124 may travel. In a representative embodiment of the present invention, the gateway 118 may comprise, for example, a set top box that may be coupled in a wireless or wired fashion to access devices such as, for example, a laptop computer or television, such as the laptop 117 and television 115 of FIG. 2. Access to communication bandwidth of a broadband network as previously described may be provided to a plurality of access devices at the location 102 by the gateway 118 and the modem 116 shown in FIG. 2. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, local multipoint distribution system (LMDS), or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 and transport network 110 to, for example, GSM network 114.

Although the present example describes operation with respect to the GSM network 114, a representative embodiment of the present invention may be employed with respect to other wireless wide area networks such as, for example, the CDMA network 112, and the other cellular/PCS service provider 146 shown in FIG. 1.

In a representative embodiment of the present invention, a wireless broadband access gateway such as, for example, the gateway 118 may act as a low-power base station to a wireless wide area network compatible access device such as, for example, a cellular or mobile multimedia handset. For example, the gateway 118 of FIG. 2 may provide wireless wire area network access for an access device such as, for example, the access device 124 of FIG. 2. Communication between the gateway 118 and an associated wireless wide area network such as, for example, the GSM network 114 may be supported via a broadband network that also carries packet traffic unrelated to that supporting the operation of the wireless wide area network, and both the signaling/control messaging and the voice/data/multimedia traffic to/from the gateway 118 may be carried via the same broadband network such as, for example, the broadband network comprising BAP 106 and transport network 110. One function of the gateway 118 may be to perform the translation between the communication protocols used by the BAP 106 to which gateway 118 is connected, and the air interface protocols used by a wireless wide area network such as, for example, the GSM network 114.

In representative embodiments of the present invention, information about an access device and an associated wireless broadband access gateway may reside in a home location register such as, for example, the integrated VLR/HLR 114*h* of the GSM network 114, in a stand-alone HLR associated with the GSM network 114, or in the HLR of another wireless wide area network service provider such as, for example, the HLR 147 of the other cellular/PCS service provider 146. Information in a VLR/HLR such a VLR/HLR 114*h* may comprise, for example, information such as that stored for access devices (e.g., the access device 124) that are not associated with a broadband access gateway like the gateway 118, and may also comprise additional information related to an association of an access device (e.g., the access device 124) with the gateway 118, and the support of enhanced wireless wide area network service via the gateway 118.

In a representative embodiment of the present invention, a wireless broadband access gateway such as, for example, the gateway 118 with wireless interface 120 of FIG. 2 may broadcast signals that may cause access device such as, for example, cellular and mobile multimedia handsets to recognize the gateway 118 with wireless interface 120 as a valid provider of wireless wide area network service like that of GSM network 114, for example. The gateway 118 may be provisioned by an associated wireless wide area network such as, for example, the GSM network 114, with operating parameters that permit the gateway 118 to support seamless coverage between the larger coverage area of the GSM network 114 and the smaller coverage area of the wireless interface 120. The provisioning of the gateway 118 may be performed by the central control and management function 148 and/or elements of the GSM network 114 such as, for example, the BWC 114c and/or the MSC 114g. The provisioned parameters may comprise, for example, one or more radio frequencies or channels, time slots, signal strengths, thresholds, identification information, lists of nearby (neighbor) base stations of a surrounding wireless wide area network, encryption parameters, physical location, geographic coordinates, information for broadcast to access devices, and the like.

In a representative embodiment of the present invention, the presence of an access device such as, for example, a cellular or mobile multimedia handset that is within the coverage area of a wireless broadband access gateway like gateway 118, for example, and that is not actively engaged in a call may be detected when the access device attempts to register with the serving network (i.e., the gateway 118.) For example, upon being powered up and detecting compatible wireless wide area network signals, an access device such as, for example, the access device 124 that may be a cellular or mobile multimedia handset, may attempt to perform a power-up registration with the serving wireless wide area network (e.g., the gateway 118). In performing such a registration, the access device 124 may identify itself to the serving network (i.e., via the gateway 118), and the receiver of the registration (i.e., the gateway 118) may be identified as the current serving base station. In a representative embodiment of the present invention, other forms of registration may also be performed by an access device within the coverage area of the gateway 118 such as, for example, power-down registration, periodic or time-based registration, distance-based registration, and zone-based registration, to name only a few. Upon receiving registration information from an access device, a wireless broadband access gateway in accordance with a representative embodiment of the present invention may, for example, provide its own identity, and other parameters, to a visitor location register and/or home location register such as the integrated VLR/HLR 114h, or the HLR 147 associated with the other cellular/PCS service provider 146, via the broadband connection 107, the BAP 106, and the BWC 114c. Information resident in a VLR and/or HLR, or in a similar functional entity, may be used to determine the whereabouts and particulars of an access device in a wireless wide area network such as, for example, the GSM network 114.

In a representative embodiment of the present invention, a user of an access device such as, for example, the access device 124 being served by a wireless broadband access gateway such as, for example, the gateway 118 and wireless interface 120 may desire to originate a call. The user of the access device 124 served by the gateway 118 may employ the same call origination (i.e., dialing) procedures as those used when being served by a wireless wide area network such as, for example, the GSM network 114. Wireless messaging received from the access device 124 by the gateway 118 with wireless interface 120 may be converted from the protocol format employed by the access device 124 (i.e., that used on the air interface of the GSM network 114) to a form suitable for transmission to the BWC 114c of the GSM network 114 via the packet protocol supported by the broadband connection 107 and the BAP 106, for example. In a similar fashion, responses from the GSM network 114 may be receive by the gateway 118 from the BWC 114c via the broadband connection 107 from the BAP 106, and may be converted, as needed, to the air interface format used in communicating with the access device 124. The central control and management function 148, the BWC 114c, the MSC 114g, or any combination may manage the mapping of signaling and control, voice, and multimedia messaging to/from the gateway 118 from/to the GSM network 114, for example. In addition, in a representative embodiment of the present invention, any of the access device 124, the BWC 114c, the MSC 114g, and the central control and management function 148 may participate in the management of the handoff of the access device 124 between the coverage area of the wireless interface 120, and that of the base stations of the GSM network 114 (e.g., the base station 114a).

In a representative embodiment of the present invention, a wireless access device such as, for example, the access device 124 that is in communication with a wireless wide area network such as, for example, the access device 124 and the GSM network 114, may be engaged in a call, and may determine at some point during the call that signal conditions warrant the handoff of communication between the access device 124 and the GSM network 114, to the gateway 118 and wireless interface 120. Such a determination may be based, for example, upon a signal strength, a signal-to-noise ratio, a geographical and/or physical location or distance, an error rate, or any combination of the above, including other parameters employed by the GSM network 114. The types of parameters used in making such a determination, and the conditions under which communication may be handed off, may be provided to the access device 124 and/or the gateway 118 and wireless interface 120 by the central control and management block 148 and/or the broadband wireless controller 114c of the GSM network 114, for example. Such parameters and conditions may be defined, for example, when wireless wide area network service via the wireless interface 120 and gateway 118 is provisioned from GSM network 114, and/or at a later time.

In a representative embodiment of the present invention, a wireless wide area network such as, for example, the GSM network 114 may serve a call between the access device 124 and another user, accessible via the GSM network 114. Because the GSM network 114 is providing wireless service to the access device 124, the identity of the subscriber/owner of the access device 124 is known to the GSM network 114. Information such as, for example, an International Mobile Equipment Identity (IMEI), an electronic serial number (ESN), an International Mobile Station Identifier (IMSI), and the like that is received from and identifies the user of the access device 124 when service is requested may be used to access subscriber information in a database such as the VLR/HLR 114h of FIG. 2, for example. Such information may be used to determine whether the subscriber/owner of the access device 124 is associated with a wireless broadband access gateway at a known location such as, for example, the gateway 118 at the location 1 102 of FIG. 2. Using this information, the GSM network 114 (e.g., the BWC 114c) may periodically inform the gateway 118 of FIG. 2, of the current operating parameters of the wireless communications link serving the access device 124. For example, the GSM network 114 may inform the gateway 118 of a radio frequency or channel in use, an assigned time slot, a voice channel, the identity of a current serving base station, a signal strength, a bit error rate, one or more operating thresholds, signal propagation delays, encryption keys, and a number of other parameters. In one representative embodiment of the present invention, upon receiving such information, the gateway 118 may begin monitoring the identified radio frequency or channel in order to detect the presence of the access device 124 that may be in the vicinity of the gateway 118. The gateway 118 may notify the GSM network 114 via the broadband connection 107 of the detection of the presence of the access device 124 within the coverage area of the wireless interface 120. The gateway 118 may include in the notice information indicating among other things, signal strength and propagation delay, for example. In a representative embodiment of the present invention, the BWC 114c and/or the MSC 114g of the GSM network 114 may, for example, use the information received from the gateway 118 to determine whether handoff of the access device 124 from a base station such as base station 114a to the gateway 118 and wireless interface 120, is appropriate. In another representative embodiment, an access device (e.g., the access device 124) may detect the presence of the wireless interface 120 of the gateway 118, and may, for example, communicate information to the GSM network 114 notifying the GSM network 114 of the detection of the gateway 118, and relevant parameters (e.g., radio frequency or channels available, time slots, the identity of the gateway 118, signal strength information, bit error/frame error rates, operating thresholds or parameters, signal propagation delays, encryption keys, and a number of other parameters.)

When a handoff of service is determined to be appropriate, the BWC 114c and/or the MSC 114g of the GSM network 114, for example, may desire to commence service through wireless interface 120 and gateway 118, and to cease over-the-air service via the wireless infrastructure of GSM network 114 such as, for example, cell site 114a. In a representative embodiment of the present invention, the GSM network 114 may notify the gateway 118 via the BAP 106 and broadband connection 107 that a handoff from the base station 114a to the wireless interface 120 of the gateway 118 is to be performed. The gateway 118, the GSM network 114, and the central control and management function 148, for example, may then exchange control and signaling information via the BAP 106 and broadband connection 107 to effect the desired handoff of the access device 124.

In another representative embodiment of the present invention, a wireless wide area network such as, for example, the GSM network 114 may be serving a call involving an access device such as, for example, the access device 124. Because the GSM network 114 is serving the access device 124, the identity of the subscriber/owner of the access device 124 is known to the GSM network 114. A determination may be made as to whether the subscriber/owner of the access device 124 is associated with a wireless broadband access gateway such as, for example, the gateway 118 at the location 102 of FIG. 2. The location of the most recent serving base station of the GSM network 114 may be found in an HLR associated with the GSM network 114 such as the VLR/HLR 114h, for example, as described above. Using subscriber information and the location of the base station that most recently provided service to the access device 124 (e.g., the base station 114a), the GSM network 114 may determine that the access device 124 is in the vicinity of a gateway (e.g., the gateway 118 of FIG. 2) that is associated with the subscriber using access device 124. The GSM network 114 may use information about the current serving base station and the gateway 118 associated with the subscriber of the access device 124, to adjust parameters sent to and used by the access device 124 in its search for possible new serving base stations. For example, the GSM network 114 may modify base station information in or add information to a neighbor list, identifying aspects (e.g., access, paging, and/or control channels; pseudo noise codes; time slots; encryption information, code channels, and similar base station parameters and characteristics) of the wireless interface 120 of the wireless broadband access gateway 118 that is associated with the access device 124. The access device 124 may then use that neighbor list information in its search for a new serving base station. In this way, the access device 124 may detect when it is within the coverage area of the associated wireless broadband access gateway 118. The access device 124 may communicate the detected handoff opportunity back to the BWC 114c and/or MSC 114g of the GSM network 114 via the current serving base station (e.g., base station 114a.) If handoff is deemed appropriate, the GSM network 114 may then communicate with the access device 124 and the gateway 118 to effect a handoff of the call from the base station 114a to the gateway 118. Following handoff, the GSM network 114 may communicate call-associated voice/multimedia information and signaling and control information to/from the access device 124 via the gateway 118, wireless interface 120, BAP 106 and broadband connection 1 107. While providing wireless service to the access device 124, the gateway 118 and wireless interface 120 may perform the task of processing and/or converting messaging in the protocol(s) employed on the over-the-air interface of the between the access device 124 and the wireless interface 120 of the gateway 118, and the messaging and protocol(s) that may be employed in communication between the gateway 118 and a wireless wide area network such as, for example, the GSM network 114. This conversion may include, for example, the processing from/to speech frames used over-the-air to/from voice packets used on the broadband connection 107 to the wireless wide area network. In addition, messaging including, for example, control messages for handoff, the taking of air interface measurements, the establishment and teardown of calls, the transfer of parameters, and other messages that are received and/or sent to the access device 124, and/or for the use of the gateway 118, may be converted and/or processed by the gateway 118.

In order to perform such tasks, a wireless broadband access gateway in accordance with a representative embodiment of the present invention may comprise protocol stack information for both a wireless wide area network protocol (e.g., for the air interface and/or for the interface between a base station and an MSC) such as those described above (e.g., for GSM, CDMA, TDMA, GPRS, etc. wireless wide area networks), and a packet protocol such as that used over a broadband connection such as, for example, the broadband connection 107 that connects the gateway 118 the GSM network 114 in FIG. 2. Suitable packet protocols may include, for example, the Internet protocol (IP), the transport control protocol (TCP), and the real time protocol (RTP), to name just a few. The above protocols may be referred to herein as Internet or packet protocols. A wireless broadband access gateway such as, for example, the gateway 118 may translate and/or encapsulate signaling and control information within the IP messaging stream carrying voice, data, and multimedia information received from the wireless interface 120 for transmission to, for example, the BWC 114c of the GSM network 114 via the packet-based link provided by a broadband access provider such as, for example, the BAP 106. In a similar fashion, functionality at the gateway 118 may extract signaling and control information contained within the stream of packets containing voice, data, and multimedia information received from, for example, the BWC 114c of the GSM network 114. In a representative embodiment of the present invention, a wireless broadband access gateway such as, for example, the gateway 118, and functionality at a wide area network such as, for example, the BWC 114c of the GSM network 114, may arrange to blend and/or tunnel signaling and control information through the other traffic (e.g., voice, data, and multimedia information) on a packet network such as that made accessible by the BAP 106.

Broadband access providers like the BAP 106 of FIG. 2, for example, that support the exchange of multimedia information such as, voice over Internet protocol (VoIIP) and streaming audio or video, for example, may support quality of service features. Such quality of service features may be used by a representative embodiment of the present invention to ensure that the quality of service of the call traffic previously carried within the infrastructure of the wireless wide area network is maintained during transfer in the broadband network packet environment between the gateway 118 and the BWC 114c. A broadband wireless controller such as, for example, the BWC 114c in a representative embodiment of the present invention may provision appropriate quality of service levels for the multimedia and control messaging associated with the operation of a wireless broadband access gateway such as the gateway 118 supporting enhanced wireless wide network support.

A wireless broadband access gateway in accordance with a representative embodiment of the present invention such as the gateway 118 of FIG. 2 may, for example, adjust for variations in propagation and/or round-trip delay in a packet-based network like the broadband network supported by the BAP 106, for example. The use of IP signaling messages supported by the broadband network, and buffering at the wireless broadband access gateway 118 may permit a representative embodiment of the present invention to adjust for varying trans-network delays typical of packet-based networks.

Because an access device within the communication range of its associated gateway may be operated at a very low RF transmit power, and no longer requires the transmission of signals from the serving wide area network, a representative embodiment of the present invention helps to free radio frequency spectrum for reuse. Such low-power operation with a small radius of coverage may simplify geo-location activities of a wireless wide area network, because the location of an access device in contact with a gateway in accordance with the present invention is known with a fairly high degree of certainty (e.g., within the limited coverage area of gateway 118). A representative embodiment in accordance with the present invention also helps to free resources (e.g., radios, time slots, voice channels, and communication links from the base stations to the respective MSC) of base stations of the wireless wide area network like base station 114a, for example, by moving subscribers off of the base stations of a wireless wide area network such as GSM network 114, to be served by wireless broadband access gateways. This permits a greater total number of subscribers to be served by a wireless wide area network, and results in a lower cost of service per subscriber, because the limited spectrum resource of the wide area network may be reused many times.

A representative embodiment of the present invention permits a single access device (e.g., multimedia mobile handset) to be used for all subscriber calls. There is no need to switch handsets when moving to and from the location of the wireless broadband access gateway such as gateway 118, for example, because in a representative embodiment of the present invention, the wireless interface 120 of the gateway 118 may be configured to support the air interface of the surrounding wireless wide area network (e.g., GSM network 114).

A representative embodiment of the present invention takes advantage of and makes more efficient use of broadband service increasingly available in home and businesses. By utilizing prevalent broadband facilities, a representative embodiment in accordance with the present invention increases the occupancy of the broadband link, spreading the cost of the link over a greater number of users and/or applications.

A representative embodiment of the present invention permits the support of an access device such as, for example, a multimedia mobile handset at a location outside of the normal coverage area of a wireless wide area network. For example, a user of an access device for which only urban wireless coverage is available may enjoy rural wireless support within a residence or business by employing a wireless broadband access gateway in accordance with the present invention. In addition, holes in service coverage due to buildings, structures, terrain, etc., may be easily and economically addressed.

Figure 3:
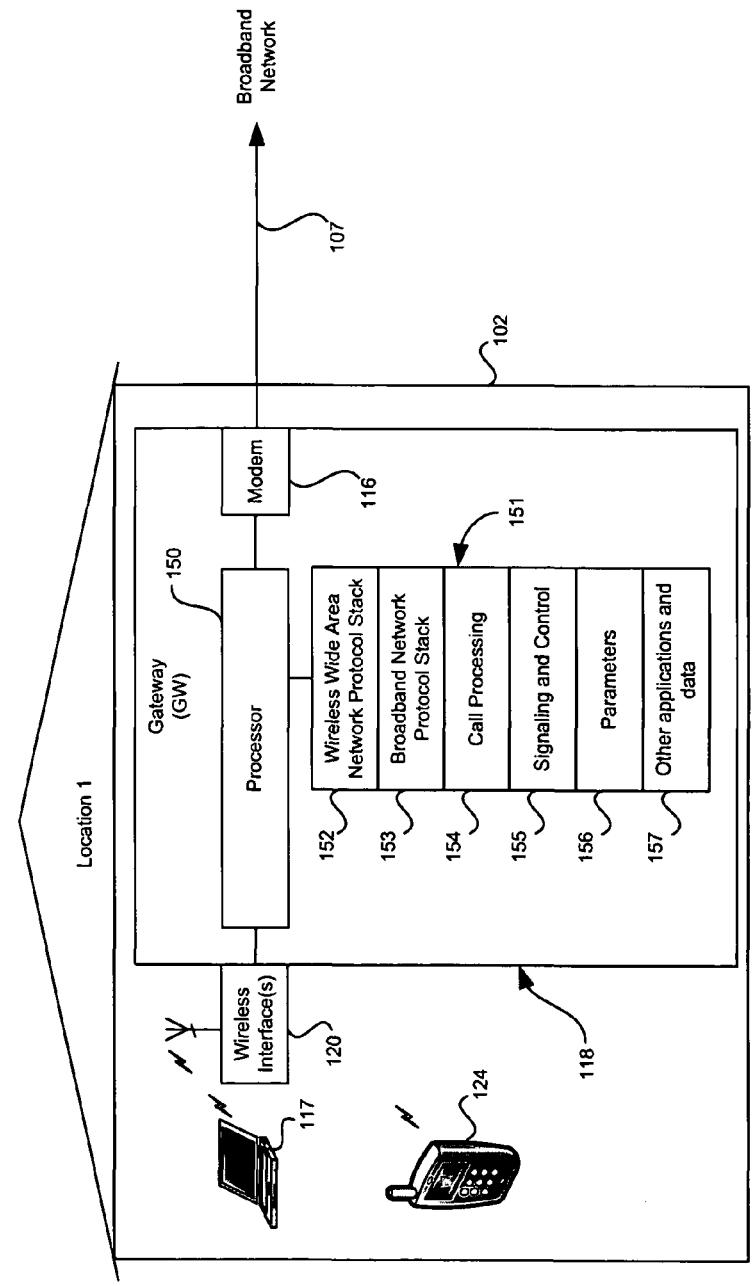
FIG. 3 shows a block diagram of an exemplary communication system showing greater detail of a wireless broadband access gateway that may correspond, for example, to the gateway of FIG. 2, in accordance with a representative embodiment of the present invention.

FIG. 3 shows a block diagram of an exemplary communication system 300 showing greater detail of a wireless broadband access gateway that may correspond, for example, to the gateway 118 of FIG. 2, in accordance with a representative embodiment of the present invention. The communication system 300 comprises a gateway 118, a wireless interface 120, a broadband connection 107, a laptop 117, and an access device 124. The wireless interface 120 may be compatible with any of the wireless wide area network standards discussed above including, for example, GSM, CDMA, TDMA, TD-CDMA, and/or W-CDMA. The access device 124 may comprise a cellular or mobile multimedia handset compatible with the wireless air interface standard of the wireless interface 120. The broadband connection 107 may correspond, for example, to the broadband connection 107 of FIG. 2, and may comprise, for example, a DSL, satellite, T1, T3, cable, or similar broadband network connection. The gateway 118 of FIG. 3 may comprise a processor 150 communicatively coupled to a modem 116. The processor may also be communicatively coupled to the wireless interface 120. The modem 116 may be communicatively coupled to and compatible with the broadband connection 107. The gateway 118 may comprise storage 151 that may be accessible to the processor 150. The storage 151 of FIG. 3 may comprise executable code such as, for example, wireless wide area network protocol stack code 152, broadband network protocol stack code 153, call processing code 154, signaling and control code 155, parameters 156, and other applications and data code 157.

In a representative embodiment of the present invention, a wireless broadband access gateway such as, for example, the gateway 118 of FIG. 3 may communicate with a wireless wide area network to provide seamless wireless wide area network coverage via a broadband network. The wireless wide area network may comprise, for example, the GSM network 114, the CMDA network 112, or the other cellular/PCS service provider 146 of FIG. 1. The processor 150 may communicate with a broadband wireless controller such as, for example, the broadband wireless controller (BWC) 114c of FIG. 2 to enable the wireless broadband access gateway 118 to act as a local, small-coverage-area base station of the wireless wide area network. The processor 150 may use code in the storage 151 to communicate, for example, signaling, control, voice, data, and multimedia information to and from the broadband wireless controller 114c of the wireless wide area network via a broadband network. The broadband network used to transport the call-related traffic may also carry other non-call related traffic such as, for example, digitized voice, data, digitized still images, digitized video, streaming video, and broadcast video. It should be clear that the capacity of a typical broadband connection such as the broadband connection 107 is more than sufficient to support the bandwidth needs of an access device normally used with a wireless wide area network such as the GSM network 114, concurrent with the other communication activities that may occur at the location 1 102.

In a representative embodiment of the present invention, communication of the call-related information may comprise translation/conversion of messages in an air interface protocol to a packet or IP protocol, and vice versa, and may involve the buffering of data exchanged with the wireless wide area network, in order to adjust for varying propagation delays through the broadband network. Quality of service (QoS) algorithms in the code of storage 151 may provide dynamic bandwidth allocation to insure that call quality is not impacted for access devices that are handed-off to the service of the wireless interface 120 and gateway 118 of FIG. 3.

As described previously, a wireless interface such as the wireless interface 120 of FIG. 3 may support a variety of air interface protocols including, for example, IS-95 CDMA, GSM, IS-136 TDMA, W-CDMA, TD-CDMA, TS-SCDMA, to name only a few. To support a variety of air interfaces in use now, and be adaptable to future changes in wireless standards, the wireless interface 120 may comprise a software definable radio for communication with access devices. Executable code and parameters for such a software-definable radio may be transferred to the wireless interface 120 and gateway 118 from, for example, a wireless wide area network (e.g., GSM network 114) with which the gateway 118 may be in communication with which it may exchange access device service responsibility. Executable code may also be transferred to a gateway such as the gateway 118, for example, to enable the gateway 118 to communicate with a number of wireless wide area networks like the GSM network 114, the CDMA network 112, and the other cellular/PCS service provider 146 of FIG. 2, for example. Such executable code may be capable of processing messaging for the exchange of multimedia information such as voice and data, and for the conversion/translation and processing of messaging for the control of a gateway such as the gateway 118, and the management of an access device during a call session.

In one representative embodiment of the present invention, the operating parameters of an access device like access device 124, for example, may be adjusted to have the access device 124 search for signals (e.g., pilot, paging, or other broadcast channels of the air interface) transmitted by the associated broadband access gateway 118, immediately following establishment of the wireless wide area network call. Upon detecting such signals, the access device may notify a network entity such as, for example, the BWC 114c, the MSC 114e, and/or another entity capable of coordinating and managing call routing and resource allocation.

In another representative embodiment of the present invention, the operating parameters of an access device like access device 124 may be adjusted to have the access device 124 search for signals (e.g., pilot, paging, or other broadcast channels of the air interface) transmitted by the associated broadband access gateway 118, once the access device is determined to be in the vicinity of an associated gateway like gateway 118, for example. In this manner, the access device 124 may monitor those base stations nearest the current location of the access device 124, and that are most likely to be next to provide service.

Figure 4:
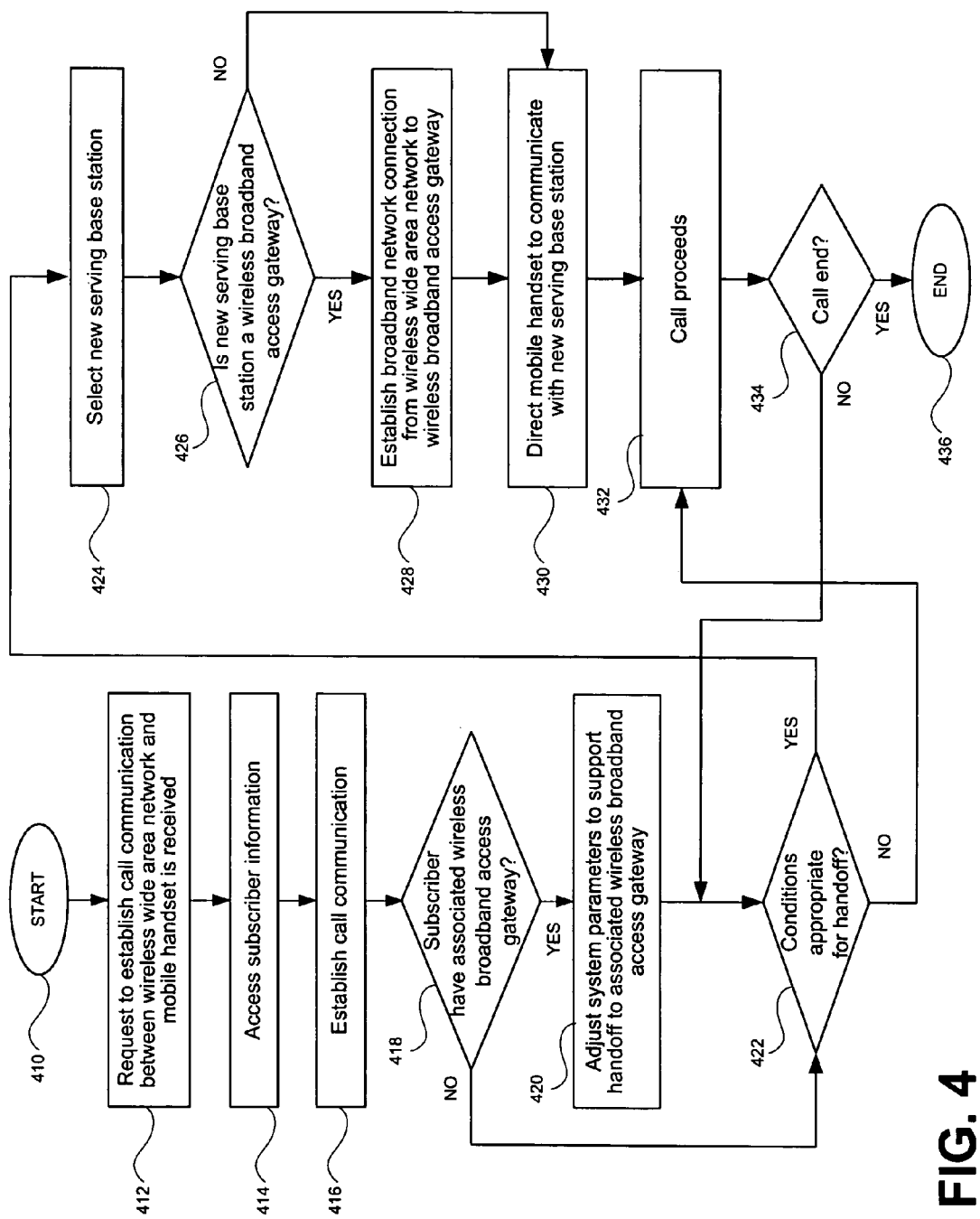
FIG. 4 shows a flowchart illustrating an exemplary method of operating a wireless broadband access gateway capable of enhanced wide area network support, in accordance with a representative embodiment of the present invention.

FIG. 4 shows a flowchart illustrating an exemplary method of operating a wireless broadband access gateway capable of enhanced wide area network support, in accordance with a representative embodiment of the present invention. As shown in FIG. 4, the method may begin before the start of a wireless wide area network call, at a start block 410. A wireless wide area network such as, for example, the GSM network 114 of FIG. 2 may then receive a request to establish call communication between the wireless wide area network and a mobile handset such as, for example, a cellular or mobile multimedia handset (block 412). The wireless wide area network may then access subscriber information (block 414), and may establish the call (block 416). The wireless wide area network may then determine whether the subscriber has an associated wireless broadband access gateway (block 418). If it is determined that the subscriber does not have an associated wireless broadband access gateway (block 418), the method may manage the call by determining whether conditions of the call are appropriate for handoff (block 422). If call conditions are not appropriate for handoff (block 422), the call proceeds (block 432), and a check is made as to whether the call has ended (block 434). If the call has ended (block 434), the method terminates (block 436). If however the call has not ended, the method returns to determine whether conditions are appropriate for a handoff (block 422).

If it is determined that the subscriber does have an associated wireless broadband access gateway (block 418), the wireless wide area network may adjust system parameters to support handoff of the wireless wide area network call to the associated wireless broadband access gateway (block 420). This may include, for example, incorporating information identifying the associated broadband access gateway into neighbor lists of wide area network base stations near the associated broadband access gateway. The method may then determine whether conditions of the call are appropriate for handoff (block 422). If conditions are appropriate for handoff (block 422), a new serving base station is selected (block 424). The method then determines whether the new serving base station is a wireless broadband access gateway associated with the subscriber (block 426). If it is determined that the selected new serving base station is a wireless broadband access gateway associated with the subscriber (block 426), then a broadband network connection may be established from the wireless wide area network to the associated wireless broadband access gateway (block 428). The mobile may then be directed to communicate using the newly selected serving base station (i.e., the wireless broadband access gateway) associated with the subscriber (block 430). The call then proceeds (block 432), and a check is made whether the call has ended (block 434). If it is determined that the newly selected serving base station is not a wireless broadband access gateway associated with the subscriber (block 426), the mobile is directed to communicate using the newly selected serving base station (e.g., one of the base stations of the wireless wide area network) (block 430). The call then proceeds (block 432), and a check is made whether the call has ended (block 434). If the call has ended (block 434), the method of FIG. 4 terminates (block 436). If the call has not ended (block 434), the method loops to another of a series of checks whether handoff is appropriate, etc.

In various representative embodiments of the present invention, the wireless interface of the wireless broadband access gateway may be compatible with wide area networks including cellular digital packet data (CDPD), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few. In addition, the wireless interface may be compatible with personal/local area networks such as, for example, a Bluetooth network, an Institute of Electrical and Electronics Engineer (IEEE) 802.11a/b/g/n compliant wireless network, and/or an IEEE 802.15.3a ultrawideband network such as those located in homes, hot spots or an office. Such local area networks may operate in unlicensed radio frequency spectrum such as in, for example, the 2.4 and 5 gigahertz regions.

The personal area networks/wireless local area networks may include data networks such as, for example, Institute of Electrical and Electronics Engineer (IEEE) 802.15.3a compliant ultrawideband wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet, a wireless local area network or another LAN or WAN via the Bluetooth® wireless PAN.

In a representative embodiment of the present invention, a wireless broadband access gateway may be adapted to provide seamless and transparent communication across a wireless wide area network, and local wireless coverage provided by the wireless broadband access gateway. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

The content and application services supported by an embodiment of the present invention may be of significant importance, because all information coming into and leaving the home from either the WAN side (i.e., the broadband connection side), or from the PAN/WLAN side (i.e., the access device side) converges at the gateway. The PAN/WLAN side may comprise a Bluetooth/IEEE 802.15.3a, a wireless LAN (802.11a/b/g), and/or a cellular network, for example. Notwithstanding, the gateway may be adapted to convert wirelessly received GSM-formatted information into, for example, Internet protocol (IP)-formatted information and in reverse, may convert IP-formatted information into wireless GSM-formatted information suitable for over-the-air transmission. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

A representative embodiment of the present invention is an effort to solve the cost and signal propagation or penetration problems in homes and small businesses by utilizing an wireless broadband access gateway that is installed inside the homes, offices, and small businesses. A wireless broadband access gateway in accordance with the present invention may be adapted to utilize licensed spectrum such as, for example, that provided for the use of commercial wireless wide area networks, in addition to unlicensed spectrum at 2.4 or 5.8 GHz, and may generally function as a gateway and/or bridge. In other representative embodiments of the present invention, the broadband access gateway may actually function more like a bridge rather than an actual gateway. The backbone links utilized by such a gateway may leverage existing broadband infrastructure that is commonly found in many homes and businesses today. Because a consumer is already paying for the use of the broadband infrastructure in their home or office, leveraging the use of the existing broadband infrastructure for the backbone link results in minimal or no additional communication costs. The broadband backbone infrastructure may be, for example, a cable or DSL infrastructure.

A representative embodiment of the present invention provides an improved quality of service, due to the quality of signals from the wireless broadband access gateway in the limited coverage area that is supported. Higher data rates and lower bit error rates may be expected due to the improvement in signal to noise ratio (SNR). The small size of the coverage area of a wireless broadband access gateway in accordance with a representative embodiment of the present invention improves frequency re-use, permitting a wireless wide area network service provider to increase system subscriber load. The use of a wireless broadband access gateway in accordance with a representative embodiment of the present invention also shifts wireless wide area network load off of the typical base-station infrastructure, freeing resources that may be used to service a greater number of subscribers. The broadband network that supports a wireless broadband access gateway in such an embodiment is also more suitable for the transport of large volumes of data, and is equally capable of carrying voice traffic with a manageable quality of service.

In a representative embodiment of the present invention, the wireless interface function provided by the wireless broadband access gateway located within a home, for example, may be utilized to route a great deal of traffic to a wired network such as a broadband network or a wireless network such as a GSM or CDMA network via a broadband connection. In other words, the wireless broadband access gateway infrastructure provided within a home provides a scalable network infrastructure that rides on an existing access infrastructure already supplied by a broadband service provider to a home, office or business. Additionally, the scalable infrastructure provided by the wireless broadband access gateway also solves problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. Numerous basic and enhanced communication services may be enabled or provided by a wireless broadband access gateway in accordance with a representative embodiment of the present invention. Access devices such as, for example, a mobile multimedia handset that embodies a high functionality combination of a cellular phone, personal digital assistant, still and/or video camera, and audio player, for example, may utilize these basic and enhanced communication services enabled by the new wave of digital technologies. Representative embodiments of the present invention provide the range of support needed for their use by the everyday consumer.

Aspects of the present invention may be seen in a communication system providing enhanced wide area network support via a broadband access gateway. Such a system may comprise a wireless wide area network capable of supporting call communication with a plurality of wireless access devices, and a gateway device. The gateway device may comprise at least one wireless interface compatible with the plurality of wireless access devices. The gateway device may be communicatively coupled to the wireless wide area network via a broadband network, and may be associated with at least one wireless wide area network subscriber. In a representative embodiment of the present invention, the gateway device and the wireless wide area network may operate to permit handoff of wireless access device call communication between the at least one wireless interface and the wireless wide area network.

In a representative embodiment of the present invention the wireless wide area network may comprise a cellular network, and the plurality of wireless access devices may comprise one of the following: a cellular telephone, a mobile multimedia handset, and a personal computer. The gateway device may comprise a television set top box for providing cable television service, and the broadband network may comprise a commercial cable television network. In other representative embodiments of the present invention, the broadband network may comprise a digital subscriber line (DSL) network, and a public packet network. Handoff of an access device may be permitted only after it is determined that the access device has a predefined relationship to the gateway device. The broadband network may transport multimedia information unrelated to communication activities of the wireless wide area network. The gateway device may perform conversion between air interface messaging used by wireless access devices, and messaging used for communication, via the broadband network, with the wireless wide area network. The broadband network may employ a packet protocol, and the packet protocol may comprise at least one of the following: the transport control protocol (TCP) and the Internet protocol (IP).

Additional aspects of the present invention may be observed in a gateway device capable of communication, via at least one wireless interface, with a plurality of wireless access devices. The gateway device may support wireless call communication between the at least one wireless interface and a wireless wide area network via a broadband network, and may adapt call related messaging between an air interface protocol used for communication with wireless access devices and a packet protocol used for communication via the broadband network. The wireless wide area network may comprise a cellular network, and the plurality of wireless access devices may comprise one of the following: a cellular telephone, a mobile multimedia handset, and a personal computer. The gateway device may comprise a television set top box for providing cable television service, and the broadband network may comprise a commercial cable television network. The broadband network may comprise a digital subscriber line (DSL) network, and the broadband network may comprise a public packet network. In a representative embodiment of the present invention, the gateway device may provide wireless service only to wireless wide area network subscribers specifically associated with the gateway device.

Yet other aspects of the present invention may be found in a method of providing enhanced wireless wide area network service to a plurality of access devices via a broadband access gateway. Such a method may comprise receiving a first message using a first protocol from the wireless wide area network via a broadband network, and transmitting to one of the plurality of access devices using a second protocol, a first wireless message based upon the first message. The method may also comprise accepting, from the one of the plurality of access devices using the second protocol, a second wireless message, and sending to the wireless wide area network via the broadband network using the first protocol, a second message based upon the second wireless message. The first protocol may comprise a packet protocol, and the packet protocol may comprise one of the following: the transport control protocol (TCP) and the Internet protocol (IP). The second protocol may comprise an air interface protocol for a public wireless network, and the air interface protocol may comprise a time division multiple access protocol, and the air interface protocol may comprise a code division multiple access protocol. The broadband access gateway may comprise a set top box for connection to a television, and the plurality of access devices may comprise a cellular phone, and a mobile multimedia handset. In a representative embodiment of the present invention, service may be provided only to wireless wide area network subscribers specifically associated with the broadband access gateway. The broadband network may comprise a cable television network, and a digital subscriber line (DSL) network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication system providing enhanced wide area network support via a gateway device, the system comprising:
   a wireless wide area network operable to support call communication with a plurality of wireless access devices;
   the gateway device comprising at least one wireless interface compatible with the plurality of wireless access devices, the gateway device arranged to communicatively couple to the wireless wide area network via a broadband network, the gateway device associated with at least one wireless wide area network subscriber;

wherein the gateway device performs conversion between air interface messaging used by wireless access devices, and messaging used for communication, via the broadband network, with the wireless wide area network; and wherein the gateway device and the wireless wide area network operate to permit handoff of wireless access device call communication for the at least one wireless wide area network subscriber between the at least one wireless interface and the wireless wide area network, if it is determined that an association of the gateway device with the at least one wireless wide area network subscriber is known to the wireless wide area network prior to call establishment.

2. The system according to claim 1 wherein the wireless wide area network comprises a cellular network.

3. The system according to claim 1 wherein the plurality of wireless access devices comprises one of the following: a cellular telephone, a mobile multimedia handset, and a personal computer.

4. The system according to claim 1 wherein the gateway device comprises a television set top box for providing cable television service.

5. The system according to claim 1 wherein the broadband network comprises a commercial cable television network.

6. The system according to claim 1 wherein the broadband network comprises a digital subscriber line (DSL) network.

7. The system according to claim 1 wherein the broadband network comprises a public packet network.

8. The system according to claim 1 wherein handoff of a wireless access device is permitted only after it is determined that the wireless access device has a predefined relationship to the gateway device.

9. The system according to claim 1 wherein the broadband network transports multimedia information comprising one or more of the following: digitized voice, data, digitized still images, digitized video, streaming video, and broadcast video that is unrelated to communication activities of the wireless wide area network.

10. The system according to claim 1 wherein the broadband network employs a packet protocol.

11. The system according to claim 10 wherein the packet protocol comprises at least one of the following: the transport control protocol (TCP) and the Internet protocol (IP).

12. A gateway device operable to communicate, via at least one wireless interface, with a plurality of wireless access devices, the gateway device supporting wireless call communication of a wireless access device of a subscriber of a wireless wide area network, via the at least one wireless interface, and the wireless wide area network, via a broadband network, and adapting call related messaging between an air interface protocol used for communication with wireless access devices and a packet protocol used for communication via the broadband network, if it is determined that an association of the gateway device with the wireless wide area network subscriber is known to the wireless wide area network prior to call establishment.

13. The gateway device according to claim 12 wherein the wireless wide area network comprises a cellular network.

14. The gateway device according to claim 12 wherein the plurality of wireless access devices comprises one of the following: a cellular telephone, a mobile multimedia handset, and a personal computer.

15. The gateway device according to claim 12 wherein the gateway device comprises a television set top box for providing cable television service.

16. The gateway device according to claim 12 wherein the broadband network comprises a commercial cable television network.

17. The gateway device according to claim 12 wherein the broadband network comprises a digital subscriber line (DSL) network.

18. The gateway device according to claim 12 wherein the broadband network comprises a public packet network.

19. The gateway device according to claim 12 wherein the gateway device provides wireless service only to wireless wide area network subscribers specifically associated with the gateway device.

20. A method of providing enhanced wireless wide area network service to a plurality of access devices via a gateway device, the method comprising:

receiving, at the gateway device, a first message using a first protocol from the wireless wide area network via a broadband network;

transmitting, by the gateway device to one of the plurality of access devices using a second protocol, a first wireless message based upon the first message;

accepting, at the gateway device from the one of the plurality of access devices using the second protocol, a second wireless message;

sending, by the gateway device to the wireless wide area network via the broadband network using the first protocol, a second message based upon the second wireless message; and wherein the gateway device operates to perform, at least, translation of one or both of signaling and control messaging, and one or more of voice, data, and multimedia messaging, between the first protocol and the second protocol to support wireless call communication between the one of the plurality of access devices and the wireless wide area network via at least one wireless interface operably coupled to the gateway device, if it is determined that an association of the gateway device with the at least one wireless wide area network subscriber is known to the wireless wide area network prior to call establishment.

21. The method according to claim 20 wherein the first protocol comprises a packet protocol.

22. The method according to claim 21 wherein the packet protocol comprises one of the following: the transport control protocol (TCP) and the Internet protocol (IP).

23. The method according to claim 20 wherein the second protocol comprises an air interface protocol for a public wireless network.

24. The method according to claim 23 wherein the air interface protocol comprises a time division multiple access protocol.

25. The method according to claim 23 wherein the air interface protocol comprises a code division multiple access protocol.

26. The method according to claim 20 wherein the gateway device comprises a set top box for connection to a television.

27. The method according to claim 20 wherein the plurality of access devices comprises a cellular phone.

28. The method according to claim 20 wherein the plurality of access devices comprises a mobile multimedia handset.

29. The method according to claim 20 wherein service is provided only to wireless wide area network subscribers specifically associated with the gateway device.

30. The method according to claim 20 wherein the broadband network comprises a cable television network.

31. The method according to claim 20 wherein the broadband network comprises a digital subscriber line (DSL) network.

32. The system according to claim 1 wherein the gateway device provides wireless service only to wireless wide area network subscribers specifically associated with the gateway device.

33. The system according to claim 1 wherein the gateway device stores one or more parameters comprising a geographic coordinate.

34. The system according to claim 33 wherein the one or more parameters are provisioned by the wireless wide area network.

35. The system according to claim 1 wherein the at least one wireless interface is located at a home or business of the at least one wireless wide area network subscriber.

36. The system according to claim 1 wherein a connection to the broadband network serving the gateway device is shared with one or both of a computer and a television of the at least one wireless wide area network subscriber.

37. The gateway device according to claim 12 wherein the gateway device stores one or more parameters comprising a geographic coordinate.

38. The gateway device according to claim 37 wherein the one or more parameters are provisioned by the wireless wide area network.

39. The gateway device according to claim 12 wherein the at least one wireless interface is located at a home or business of the at least one wireless wide area network subscriber.

40. The gateway device according to claim 12 wherein a connection to the broadband network serving the gateway device is shared with one or both of a computer and a television of the at least one wireless wide area network subscriber.

41. The method according to claim 20 wherein the gateway device stores one or more parameters comprising a geographic coordinate.

42. The method according to claim 41 wherein the one or more parameters are provisioned by the wireless wide area network.

43. The method according to claim 20 wherein the at least one wireless interface is located at a home or business of the at least one wireless wide area network subscriber.

44. The method according to claim 20 wherein a connection to the broadband network serving the gateway device is shared with one or both of a computer and a television of the at least one wireless wide area network subscriber.

* * * * *